Nov. 10, 1942.  T. BRONÉE  2,301,247
APPARATUS FOR INDICATING AT A DISTANCE THE DANGER OF
SLIPPERY ICE BEING FORMED ON ROADS
Filed Sept. 30, 1939  2 Sheets-Sheet 1

Inventor:
Corben Bronée
by Frank Reichert
Attorney

Patented Nov. 10, 1942

2,301,247

UNITED STATES PATENT OFFICE 2,301,247

APPARATUS FOR INDICATING AT A DISTANCE THE DANGER OF SLIPPERY ICE BEING FORMED ON ROADS

Torben Bronée, Berlin, Germany

Application September 30, 1939, Serial No. 297,360
In Germany October 7, 1938

3 Claims. (Cl. 73—342)

My invention relates to improvements in apparatus for indicating at a distance the danger of slippery ice being formed on roads, and the object of the improvements is to provide an apparatus by means of which the said danger is indicated in good time to permit the officials to take the proper precautions against slippery ice.

My invention is based on the discovery that the formation of slippery ice is mainly dependent upon the temperature of the air and the temperature of the surface of the road, and experiments have proved that other conditions, such for example as the humidity of the air, are of minor importance. Further, slippery ice is produced only within definite ranges of the temperatures of air and the ground. In view of this discovery my invention consists in measuring the temperature of the air and the ground at the part or parts of the road to be supervised and comparing the measurements thus obtained with the ranges of the temperatures within which the conditions of slippery ice being formed prevail.

Figure 2:
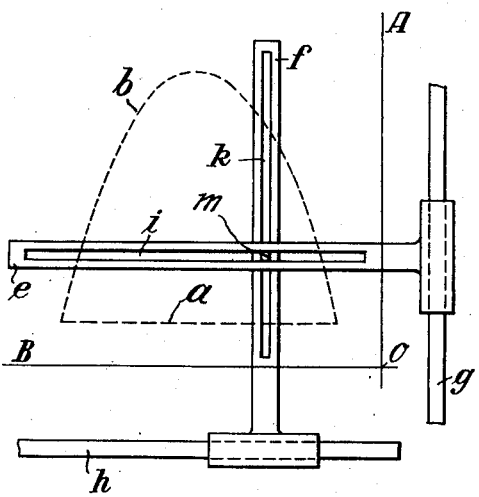
Figure 3:
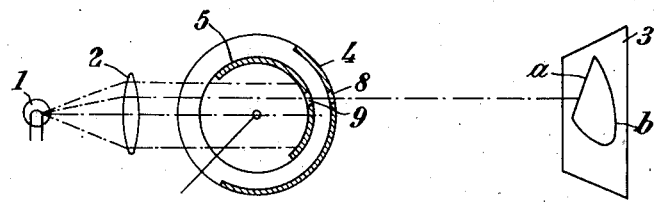
Figure 4:
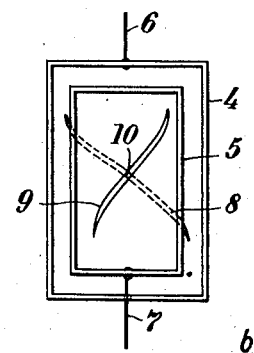
Figure 5:
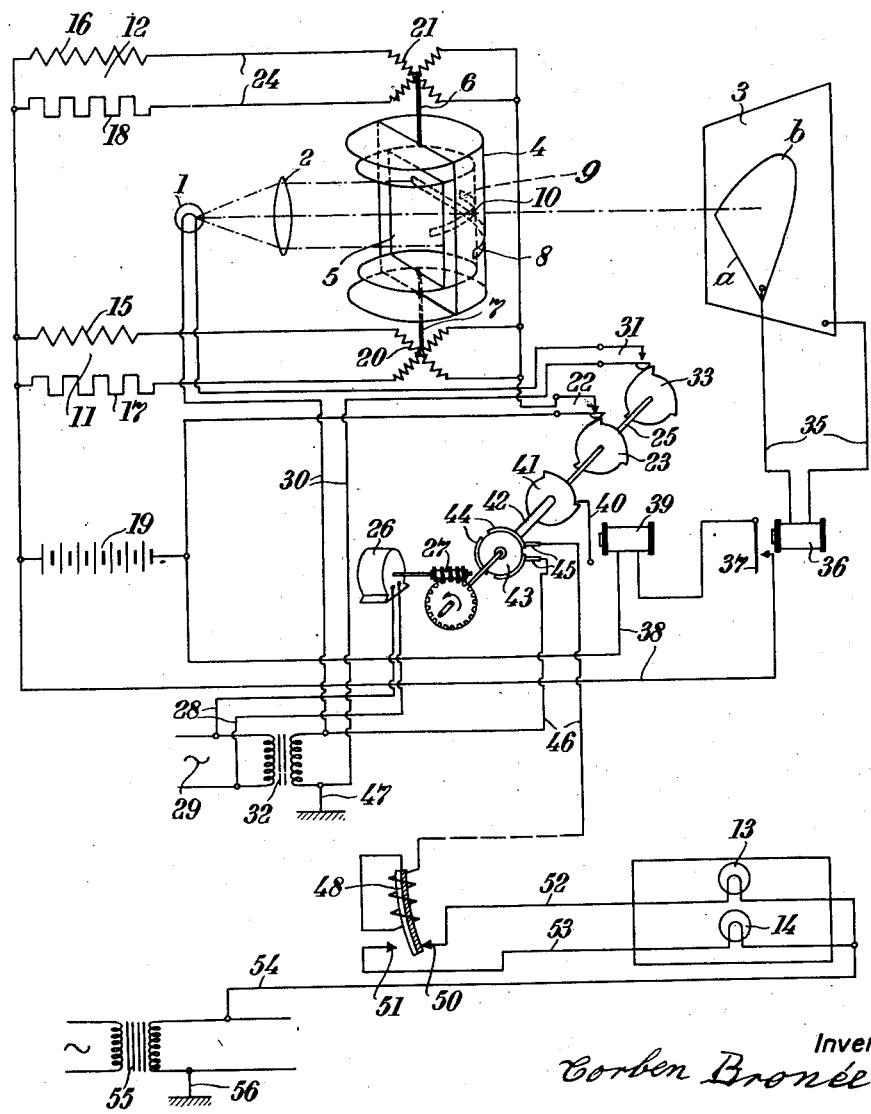

For the purpose of explaining the invention an example of an apparatus has been shown in the accompanying drawings, in which the same letters of reference have been used in all the views to indicate corresponding parts. In said drawings, Fig. 1 is a diagram showing the ranges of the temperatures of the air and the ground within which slippery ice may be formed, Fig. 2 is a diagram illustrating the principle of combining the indications of the temperatures of the air and the ground, Fig. 3 is a diagrammatical plan view partly in section illustrating optical means for combining the said indications, Fig. 4 is a diagrammatical elevation of a part of Fig. 3, and Fig. 5 is a diagrammatical view showing the whole system.

Figure 1:
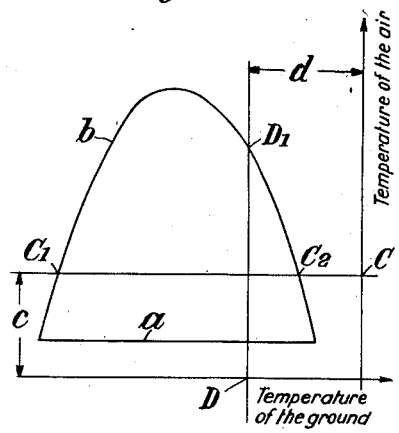

Fig. 1 shows a diagram developed in accordance with a system of coordinates, in which the abscissae represent the temperature of the ground and the ordinates the temperature of the air. If in the said system the simultaneous temperatures of ground and air be plotted at which slippery ice can form, a diagram is obtained which substantially corresponds to the curves $a$ and $b$. Thus, slippery ice is produced only if the temperature of the ground is below zero, centigrade, and the temperature of the air is above zero. Below a certain positive value of the temperature of the air, which in case of concrete roads is about 0.5° C., slippery ice is not produced, and to each higher temperature of the air corresponds a definite range of the temperature of the ground, which range gradually diminishes as the temperature of the air rises, so that above a certain maximum value of the temperature of the air slippery ice is not produced at any temperature of the ground. This upper temperature is about 6° C. At the lowest temperature of the air of about 0.5° C. the limits of the temperature of the ground is about from −1° C. to −6° C.

Therefore, in order to indicate the danger of slippery ice being formed, it is only necessary to ascertain the temperatures of the air and the ground, and to determine whether both temperatures found at a given time fall within the area circumscribed by the lines $a$—$b$. For example, if the temperature of the air has been found to be $c$, as is indicated by the line C—C$^1$, slippery ice can be produced only, if the temperature of the ground is between the limits C—C$^1$ and C—C$^2$, that is, if a line D—D$^1$ fluctuating in position and representing the fluctuating temperature $d$ of the ground, intersects the line C—C$^1$ between the points C$^1$ and C$^2$.

For convenience in reading the temperatures I may provide means for causing two lines which are respectively parallel to the axis of abscissae and to the axis of ordinates, and which represent the temperatures of the air and of the road, to travel across the said diagram $a$—$b$ in accordance with the temperatures measured on the surface of the road and in the surrounding air. If the point of intersection of the said lines falls within the said area $a$—$b$, there is the danger of slippery ice being formed, and if the said point of intersection is located outside the said area, there is no danger of ice being formed on the road.

The said lines representing the temperatures may be produced in different ways. I may produce the same by mechanical means, for example by means of two rulers or slides movable across a system of coordinates drawn on a table. Fig. 2 shows such a system in a diagrammatical way. In the said figure the system of coordinates has been represented by the lines O—A and O—B, and in the said system the diagram $a$—$b$ has been shown in dotted lines. Above the said system there are two slides $e$ and $f$ moving respectively in vertical and horizontal directions on guide rods $g$ and $h$. The said slides are formed with slits $i$ and $k$ located respectively parallel to the axis of abscissae O—B and to the axis of ordinates O—A. In the said slits a pin $m$ is guided which engages the table carrying the diagram $a$—$b$. If the said pin engages the area $a$—$b$ there is the danger of ice being formed on the particular part of the road.

In the embodiment of the invention shown in Figs. 3 and 4 optical means are provided for reproducing the temperatures of the road and the air on the table carrying the diagram $a—b$. As shown, the said optical means comprise an incandescent lamp 1 and a lens 2 located in position for throwing a pencil of parallel rays on a table 3 carrying the aforesaid diagram $a—b$. Between the said lamp 1 and the table 3 two concentric semi-cylinders 4 and 5 are rotatably mounted on vertical axes 6 and 7. Said cylinders have slits 8 and 9 made therein, which cross each other and correspond to the slits $i$ and $k$. They are adapted to be turned about their axes 6 and 7 by instruments for measuring the temperatures of the road and the surrounding air. Thus, a sectional pencil of rays passes through the point of intersection 10 of the slits 8 and 9 and onto the table 3.

In Fig. 5 I have shown a system illustrating the use of the apparatus for transmitting the indications to a central station. The system comprises two electrical devices 11 and 12 for measuring the temperatures respectively of the surface of the road and the surrounding air, a device for combining the temperature indications including the said table or screen 3, the slitted semi-cylinders 4 and 5 controlled by the said electrical devices 11 and 12 for measuring the temperatures, the source of light 1, 2, and electrical means for transmitting the combined indications from the screen to a central station including lamps 13 and 14.

The electrical devices 11 and 12 comprise resistances 15 and 16 which are dependent upon temperature and resistances 17 and 18 which are independent of temperature. The said resistances are connected to a battery 19 and to the coils of differential galvanometers 20 and 21 connected with the said axes 6 and 7 of the semi-cylinders 4 and 5. The circuits 24 including the said resistances and galvanometers include a switch 22 by means of which they are intermittently energized the said switch being controlled by a cam disk 23 fixed to a shaft 25 and slowly rotated by means of a synchronous motor 26 through the intermediary of a worm gearing 27, the said synchronous motor being connected by leads 28 with a net 29 through which alternating current is supplied.

The source of light 1, such as an incandescent lamp, is connected by leads 30 including a switch 31 with the secondary of a transformer 32. The said switch 31 is controlled by a cam disk 33 secured to the shaft 25. The cams on the disks 23 and 33 are disposed so that at first the switch 22 connected with the resistances 11 and 12 is closed and thereafter the switch 31 controlling the supply of electric energy to the lamp 1.

The pencil of rays emanating from the lamp 1 and collected by the lens 2 passes through the slits 8 and 9 made in the cylindrical walls 4 and 5, and it impinges upon the screen or table 3 and the diagram $a—b$. The area of the said diagram $a—b$ has a coating of photo-electrically sensitive materials, such as a layer of copper and copper oxide, and the said layers are connected by leads 35 with a relay 36 controlling a switch 37. The switch 37 is included in a circuit 38 which includes another relay 39 and also the battery 19, the said relay 39 controlling a pawl 40 cooperating with a cam disk 41 secured to a sleeve 42 mounted on and frictionally engaged by the shaft 25, the pawl 40 being adapted to engage cams on the cam disk 41 for locking the same in position and to release the same for being rotated by the shaft 25. To the sleeve 42 a disk 43 is secured which carries three insulated conductor segments 44 engaged by brushes 45 included in a circuit 46. One of the leads of the said circuit is connected to the secondary of the transformer 32, and the opposite terminal of the said secondary is grounded at 47. The other lead of the circuit 46 is connected with a thermo-static element 48 located at a central station, which thermo-static element controls two contacts 50 and 51 connected by leads 52 and 53 respectively with the incandescent lamps 13 and 14, the said lamps being connected by a lead 54 with the secondary of a transformer 55, which transformer is grounded at 56. Preferably the lamps 13 and 14 have differently coloured glass walls.

The operation of the system is as follows:

The resistances 11 and 12 are disposed respectively on or within the road at the part to be supervised and within the surrounding air. Normally the system is out of operation, and only the shaft 25 is rotated at uniform velocity by the synchronous motor 26. Within suitable intervals of time the cam disks 23 and 33 close the switches 22 and 31, the switch 22 being closed slightly before the switch 31. Thus currents flow through the resistances 11 and 12, and the said currents flow through the galvanometers 20 and 21, so that the screens 4 and 5 and their slits 9 and 10 are set into positions corresponding respectively to the temperatures of the road and the surrounding air. After the screens have thus been set the switch 31 is temporarily closed, and thereby energy is supplied from the transformer 32 to the lamp 1. Thus a pencil of rays passes through the point of intersection 10 of the slits 9 and 10 and onto the screen 3. If now the temperatures of the road and the surrounding air are such that the said pencil of rays impinges upon the coating of the diaphragm $a—b$ a current is generated in the said coating, which flows to the relay 36 through the lead 35. Thus the said relay is operated, and the switch 37 is closed. Now current supplied from the battery 19 flows through the circuit 38 and the relay 39. Thus the pawl 40 is retracted from the disk 41, whereupon the sleeve 42 and the disks 41 and 43 are carried along by their frictional engagement with the shaft 25. In the normal position of the parts shown in the figure the contacts 45 stand astraddle two of the conductor segments 44 and are insulated from each other, with the circuit 46 through the bimetal element 48 open and the lamp 13 dead. But when the rays of light are, as mentioned above, projected upon the light-sensitive area $a—b$, current flows through the circuit 35, closing the switch 37; the relay 39 is energized; the pawl 40 is retracted; the disks 41 and 43 rotate in unison with the shaft 25; the circuit 46 is closed by engagement of the contacts 45 with one of the advancing conductor segments 44 on the rim of disk 43; and the energizing circuit of the lamp 13 is completed through the bimetal element 48 and the contact 50, it being noted that the bimetal element normally stands in engagement with the contact 50. Due to the fact that the continuously rotating disks 23 and 33 operate to energize the lamp 1 intermittently, the beam of light that plays upon the area $a—b$ is a flashing or intermittent beam, and in consequence the above-described operations that effect the energizing of the lamp 13 are periodically repeated, and the lamp 13 is caused to glow intermittently. Under such intermittent energizing of the circuit 46, the bimetal element is heated, and under the effect of the heat it bends, swinging its lower end from engagement with contact 50 into engagement with contact 51. Thus, the circuit through lamp 14 is closed, and the lamp 14 is caused to flash, indicating that precautions against slippery ice should immediately be taken. The flashes of light emanating from the lamp attract the attention of the attendant more effectively than a continuous glow.

I claim:

1. Apparatus for determining whether slippery-ice-forming conditions exist at a particular point along a roadway such apparatus including a graduated chart bearing definition, according to a system of co-ordinates, of the limits within which the simultaneous temperatures of roadway and superjacent air are permissive of ice formation, two members severally mounted for movement in paths of fixed orientation with respect to said chart, means for moving one of said members in accordance with variations in temperature of the surface of the road at the point where determination is to be made, means for moving the other of said members in accordance with variations in the temperature of the superjacent air at such point, said relatively movable members severally having elongate slots that extend angularly to one another, said slots being arranged to intersect one another when the simultaneous temperatures of road surface and air lie within the ice-forming limits, the point of intersection varying in accordance with the temperature-controlled movements of said members, and a lamp arranged to project through the slots at the point of intersection a beam of light upon said chart, the point of impingement of said beam upon the chart representing the point on the chart whose co-ordinates correspond severally to the temperatures of road surface and air then prevailing.

2. The structure of claim 1, together with an electric signal and a signal-controlling circuit, said chart bearing upon the area that lies within said limits a coating of light-sensitive substance, said coating being included in said signal-controlling circuit.

3. Apparatus for determining whether slippery-ice-forming conditions exist at a particular point along a roadway, such apparatus including a graduated chart bearing definition, according to a system of co-ordinates, of the limits within which the simultaneous temperatures of roadway and superjacent air are permissive of ice formation, two members severally mounted for movement in paths of fixed orientation with respect to said chart, means for moving one of said members in accordance with variations in temperature of the surface of the road at the point where determination is to be made, means for moving the other of said members in accordance with variations in the temperature of the superjacent air at such point, said relatively movable members severally having elongate slots that extend angularly to one another, said slots being arranged to intersect one another when the simultaneous temperatures of road surface and air lie within the ice-forming limits, said point of intersection of the slots being correlated to said chart and adapted to signify on the chart the point whose co-ordinates correspond severally to the temperatures of road surface and air then prevailing.

TORBEN BRONÉE.